United States Patent [19]

del ser Gonzalez

[11] 4,290,350
[45] Sep. 22, 1981

[54] MACHINES FOR PITTING AND STUFFING OLIVES

[76] Inventor: Clemente del ser Gonzalez, Talleres, 36, Villaverde Alto, Madrid 21, Spain

[21] Appl. No.: 108,218

[22] Filed: Dec. 28, 1979

[30] Foreign Application Priority Data

Nov. 8, 1978 [ES] Spain .................................... 474.942

[51] Int. Cl.³ ............................................ A23N 4/08
[52] U.S. Cl. ...................................... 99/494; 99/546; 99/548; 99/561
[58] Field of Search ................. 99/494, 549, 559, 561, 99/565, 546, 548

[56] References Cited

U.S. PATENT DOCUMENTS 4,090,439  5/1978  Chall et al. ............................ 99/494
4,096,795  6/1978  Del Ser Gonzalez ................ 99/494
4,220,080  9/1980  Margaroli et al. .................... 99/494

Primary Examiner—Harvey C. Hornsby
Assistant Examiner—Timothy F. Simone
Attorney, Agent, or Firm—Toren, McGeady & Stanger

[57] ABSTRACT

In an improved machine for pitting olives and then filling them with a paste, such as an anchovy paste, the olives are supplied from a hopper to a drum rotating on a fixed shaft. As the drum rotates, the pits are displaced out of the olives into orifices in nozzles mounted on the drum. The nozzles are radially displaceable. In addition to the pit containing orifices the nozzles also contain other orifices through which the paste is fed into the olives. The paste feeding orifices are spaced radially from the pit containing orifices in the nozzles. Paste is supplied from cartridges to radial slots in a feed disc and then into the nozzles mounted on the drum. The feed disc is mounted on a shaft spaced laterally from and parallel to the shaft for the drum.

9 Claims, 29 Drawing Figures

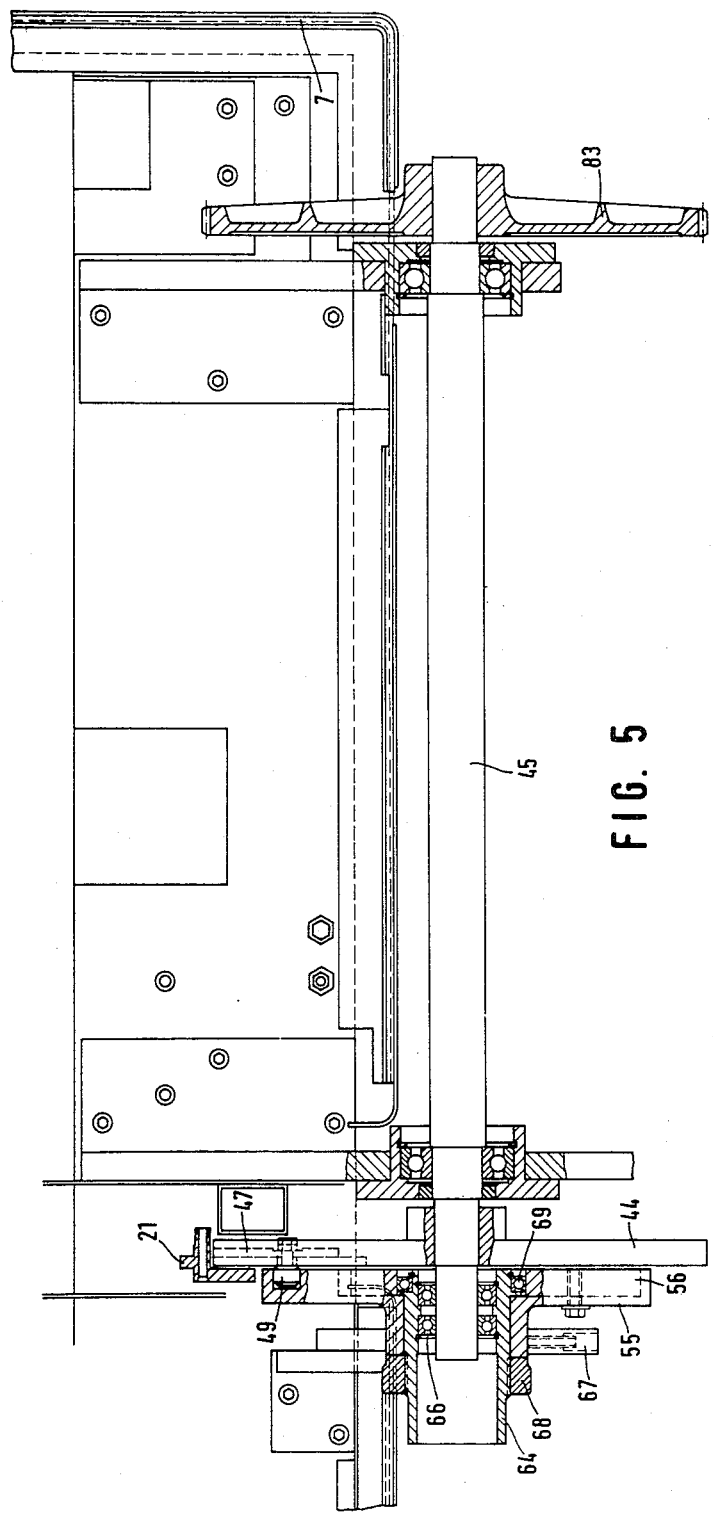

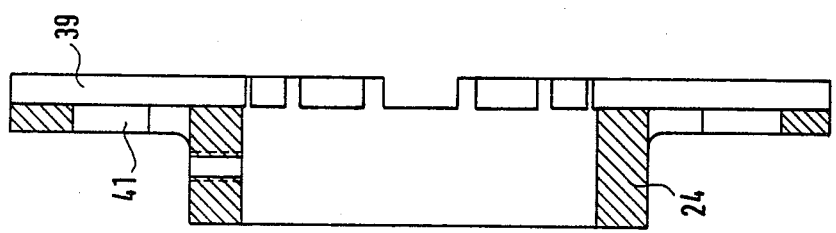
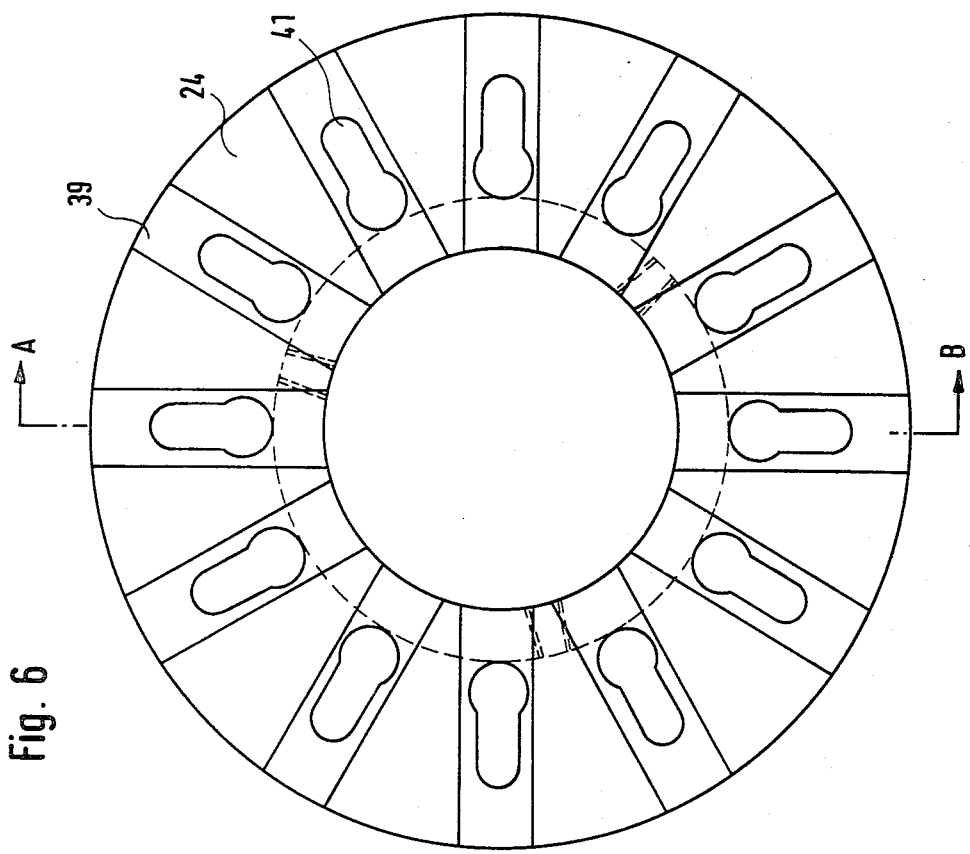

Fig. 9
Fig. 8
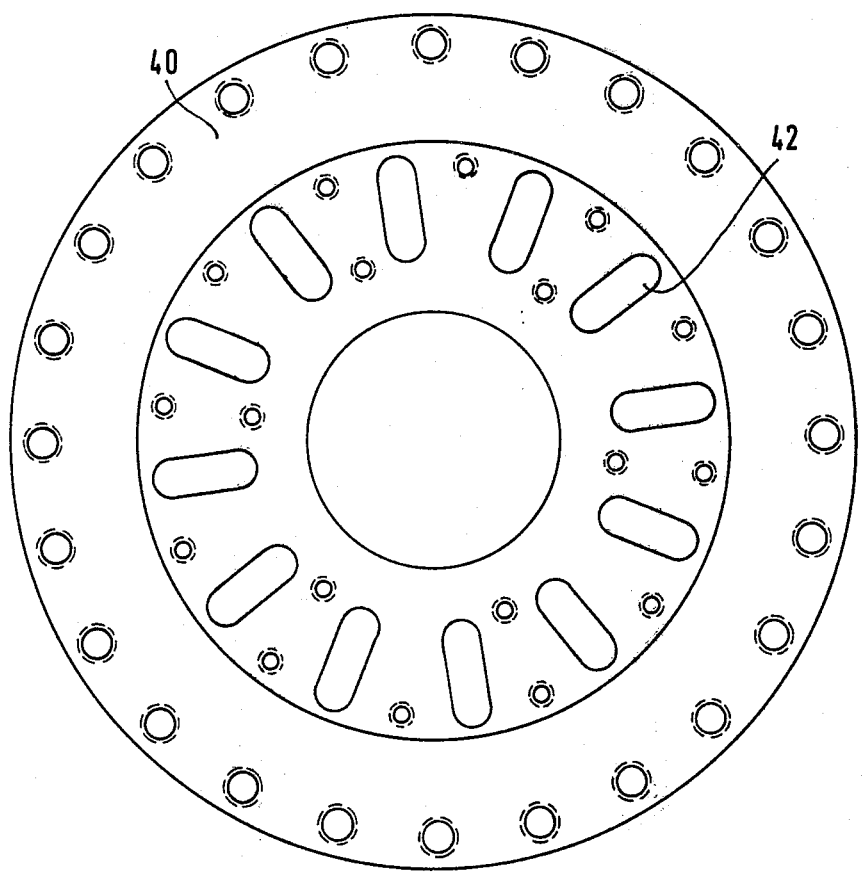

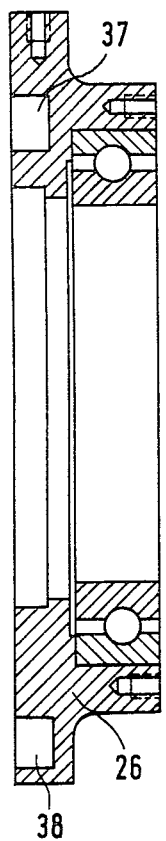
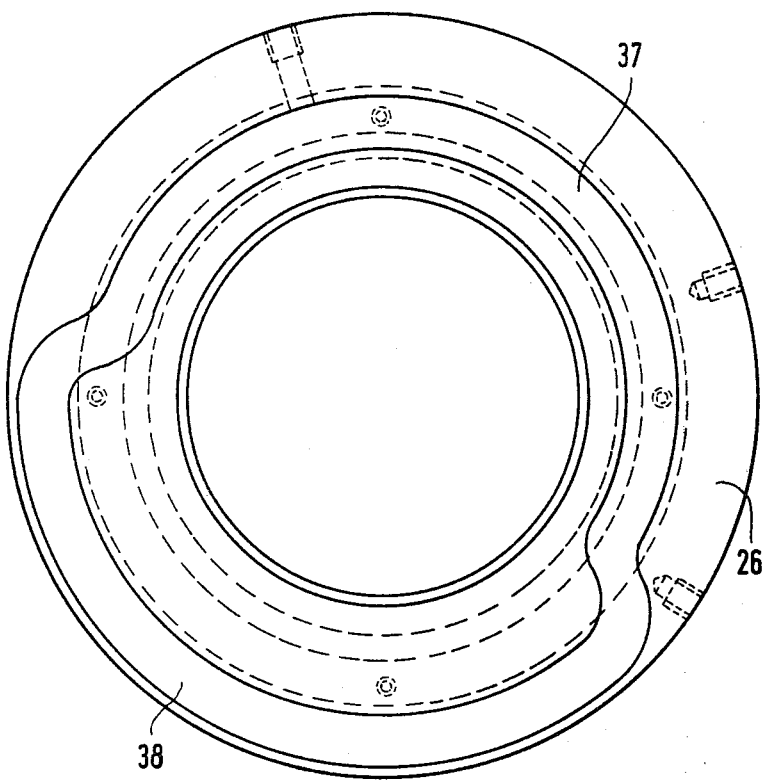
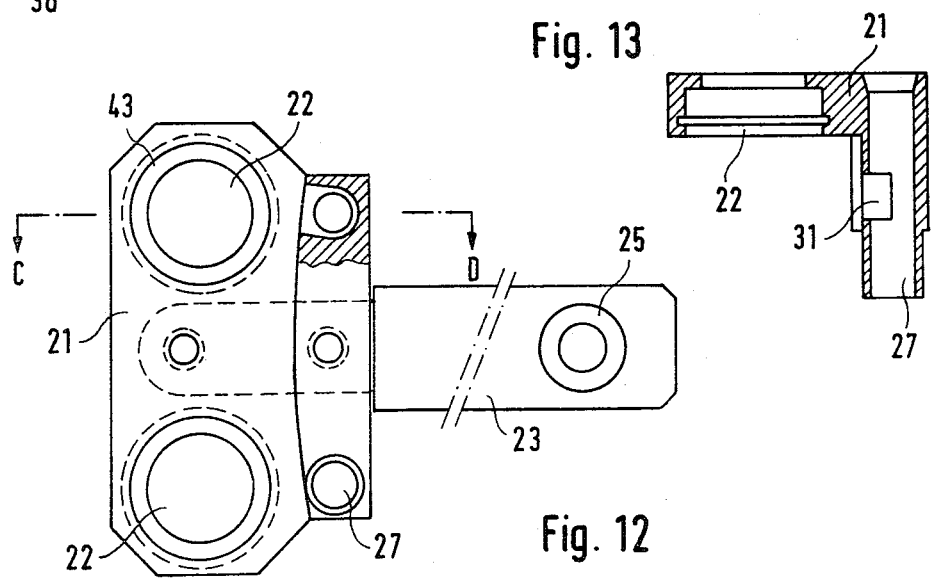
Fig. 11
Fig. 10
Fig. 13
Fig. 12

Fig. 19
Fig. 20
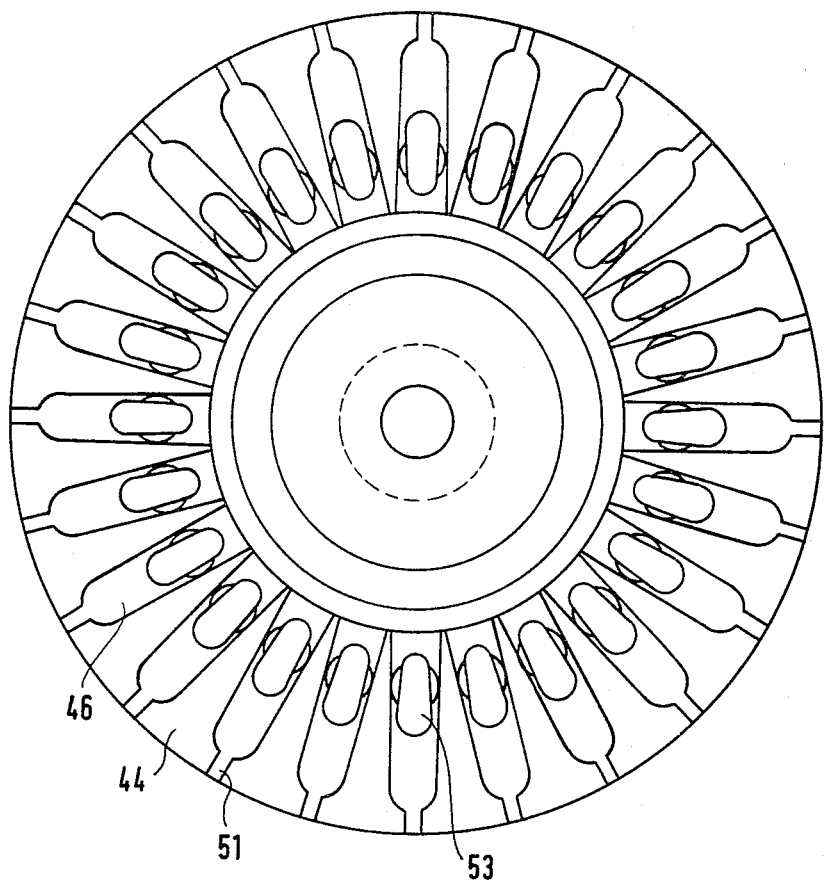
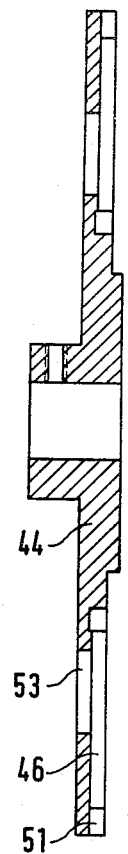

Fig. 26
Fig. 25
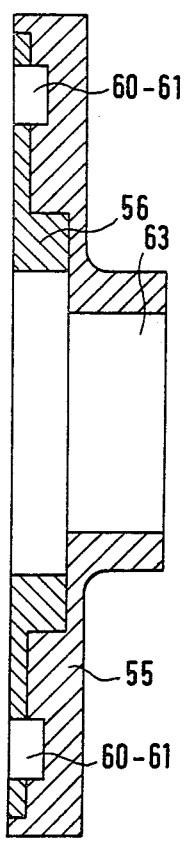
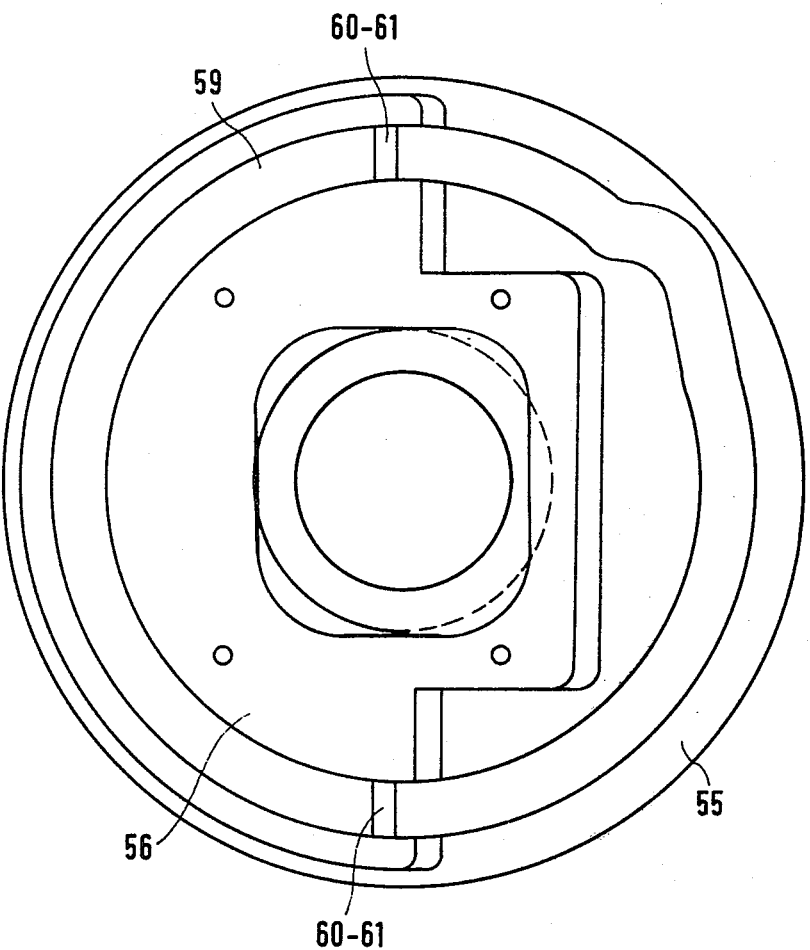

MACHINES FOR PITTING AND STUFFING OLIVES

SUMMARY OF THE INVENTION

This invention relates to a series of improvements introduced into machines for pitting and stuffing olives.

The applicant is the owner of U.S. Pat. No. 4,096,795, relating to a machine for pitting olives and subsequently stuffing them with pimento.

The aforementioned patent, which reflects the state of the art up to the time of that application, made provision for avoiding damage to the larger end of the olives caused by the ejection of the pit, by cutting out a generally circular portion of the olive meat, sufficient in size to allow the pit to be ejected by means of the action of a small diameter plunger pusher member acting through the other end of the olive, the interior space being stuffed with pimento, and also established the closing of the orifice made for the discharge of the pit.

The improvements that this invention proposes are based on the same structural and functional principles as those of the machine corresponding to the aforementioned patent. They are specifically directed to pitting the olives and stuffing them with anchovy paste or any other material that can be supplied in paste form, with the subsequent replacement of the piece of olive which was previously withdrawn in order to eject the pit and introduce the anchovy paste, and which acts as a cover.

In this way, by varying the mechanisms which supply the paste for stuffing with respect to those provided in the previous patent for stuffing with pimento, the functional characteristics of the machine are retained in regard to a speed very much higher than is permitted by machines known up to this time, and in regard to maximum guarantees of operational reliability.

Although, as has been said, the invention refers to certain parts of the machine, specifically those relating to the mechanisms for supplying the paste and to certain other complementary parts, as will be seen hereinafter, the machine will be described from a general point of view so that the structuring and functioning of these new parts and their relation to those that are retained from U.S. Pat. No. 4,096,795 may be more clearly understood. However, it is clear that the novelty relates exclusively to those points which are described in the attached claims.

Thus, a machine constructed in accordance with the improvements that are the subject of this invention, has a frame on which the driving elements of the machine are seated, and on which various mechanisms which effect the above-mentioned operations are arranged.

The process of pitting and stuffing the olives is initiated from a hopper which feeds a chain for entraining and positioning the olives towards a rotatable drum mounted on a fixed shaft, the fixed shaft having secured to it a number of cams which displace the elements which grip, cut, and pit the olives as the drum rotates.

Within the movable assembly of the machine there is a disc which carries a number of paste receiver nozzles which are displaceable axially through the effect of the respective cam, so that in a given position the nozzles can receive the anchovy paste from the paste feeder disc, while in another position, determined by the aforementioned cam, the nozzles are operationally opposed to the olives so that the appropriate plunger member causes the paste to be introduced into the interior of the olive.

There is also a paste feeder element for the aforementioned nozzles consisting of the aforementioned paste feeder disc whose axis is situated parallel to the nozzle support disc, so that the discs are tangential at the moment of effecting the transfer of the paste.

The paste feeder disc referred to is provided with a number of radially arranged grooves in the interior of which the pertinent plungers or injectors are housed and which, in turn, are displaced by a cam. The cam is fixed in its zone corresponding to the expulsion of the injectors, while in the zone corresponding to the intake of the injectors, that is to say the feeder disc loading zone, it can be varied at will, with the purpose of establishing a dosage adjusted to the amount of paste that is to be supplied to the olives.

The loading of the paste feeder disc is effected from a number of cartridges which, in the unloading position, are operationally opposed to the injector nozzles which, in turn, are opposed to the injectors in the loading zone of the disc; this operation is caused by the piston of a pneumatic cylinder which coincides on the aforementioned cartridge.

So that the normal working process of the machine is not interrupted for lack of paste, two injector nozzles have been provided, into which the tubes of paste unload alternately so that while one of the tubes is appropriately feeding the machine, the other occupies its normal working position in relation to the second injector nozzle, so that when the product contained in the first tube has been exhausted, the second tube is ready to continue the supply with perfect continuity.

The appropriate positioning of the tubes holding the paste is automatically effected on the basis of two tube feeder guides or ramps, a number of star elements cooperate in these operations which determine the outlets which correspond in shape and size to the aforementioned tubes, and which carry the tubes along at the appropriate moment, in accordance with a pre-established program, In this way, with perfect operational continuity of the machine, the olives approach the rotatable drum by means of the chain which connects the drum with the feed hopper, the gripping of the olives, the cutting of the cover, the ejection of the pit, the introduction of the anchovy paste and the subsequent and final replacement of the cover in its original position take place on the aforementioned rotatable drum; the pitted and stuffed olives fall onto a conveyor to be carried away while the pits fall onto another conveyor.

In order to complete the description that will be given hereinafter of a non-limitative example of embodiment, and with the purpose of assisting in providing a better understanding of the characteristics of the invention, this descriptive memorandum is accompanied by a set of drawings which represent the following for the purpose of illustration and while being non-limitative.

BRIEF DESCRIPTION OF THE DRAWING

FIG. 5 is a detailed plan view of the shaft which carries the injector disc and the other elements accessory to it, including the pinion which transmits the movement, this assembly is duly fastened to the machine casing.

FIG. 6 is a frontal view of the nozzle support disc.

FIG. 7 is a diametric section of the disc shown in the foregoing figure.

FIG. 8 is a frontal view of the cover of the aforementioned nozzle support disc.

FIG. 9 is a diametric section of the cover shown in the foregoing figure.

FIG. 10 is a frontal view of the cam which supplies movement to the nozzles.

FIG. 11 is a diametric section of the in FIG. 10 cam.

FIG. 12 is a frontal view of one of the paste nozzles in which the orifices which receive the olive pit appear in a plan view.

FIG. 13 is a transverse section of the aforementioned nozzle in accordance with the line C-D represented in the foregoing figure.

FIG. 19 is a frontal view of the paste feeder disc.

FIG. 20 is a diametric section of the feeder disc referred to.

FIG. 25 is a frontal view of the assembly of the two pieces which constitute the cam for the paste feeder disc injectors.

FIG. 26 is a diametric section of the assembly of the foregoing figure.

DETAILED DESCRIPTION OF THE INVENTION

Figure 1:
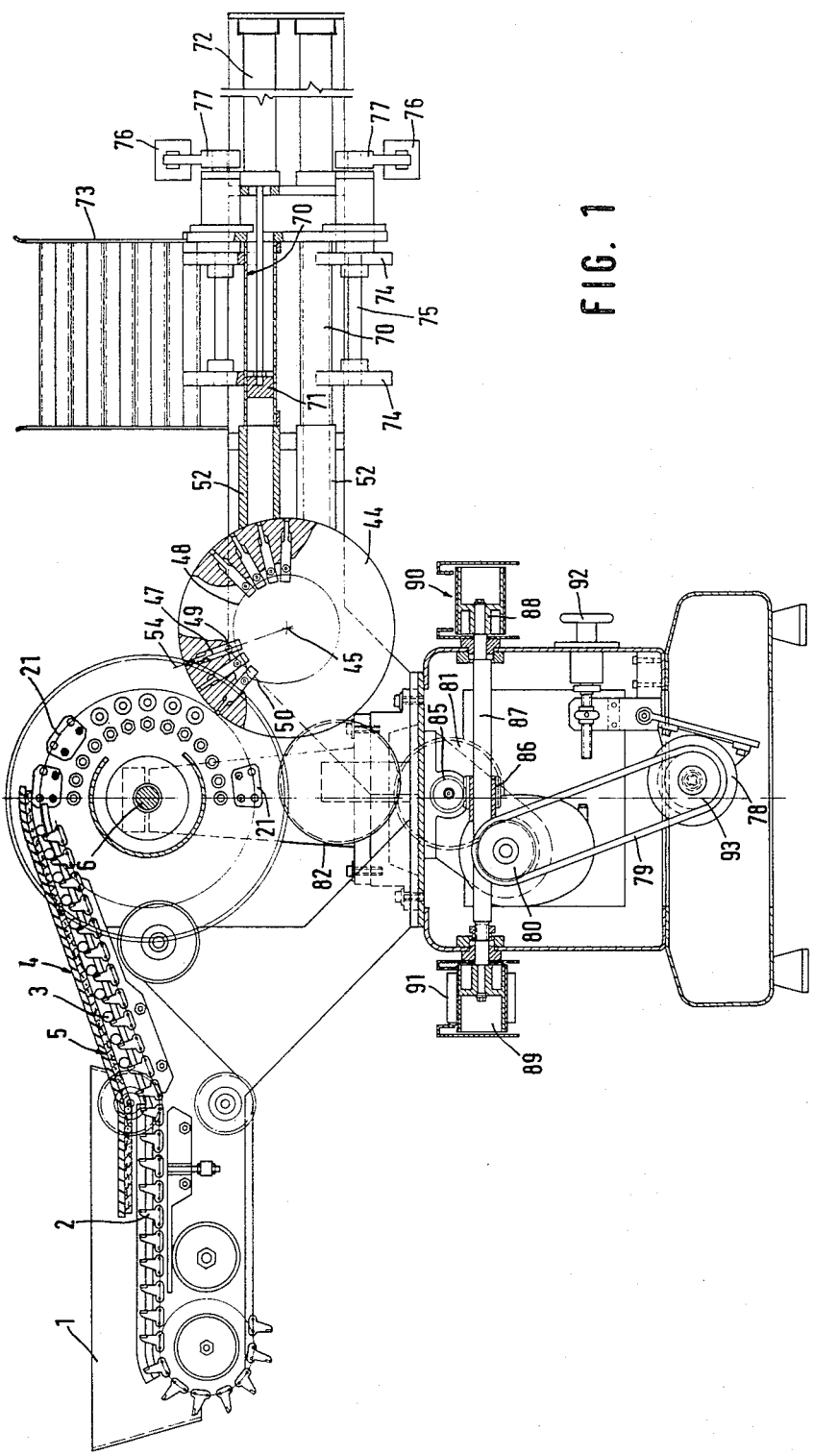
FIG. 1 is a transverse section of a machine for pitting and stuffing olives, in accordance with the improvements that are the subject of this invention, the section having been made at the level of the plane of the chain which supplies olives from the feed hopper to the rotatable drum.

Having seen these figures and following the path of the olives in the machine, it may be seen how the said machine has a feed hopper 1, from which the olives are carried towards the rotatable drum by means of a transporter chain 2, which, because of the configuration of its links, determines that the olives 3 occupy a position such that their longitudinal axis is perpendicular to their plane of sliding. The above-mentioned chain 2 is completed with a cover 4 provided on its inner face with a layer of padded material 5 which cooperates in correctly positioning the olives.

Figure 2:
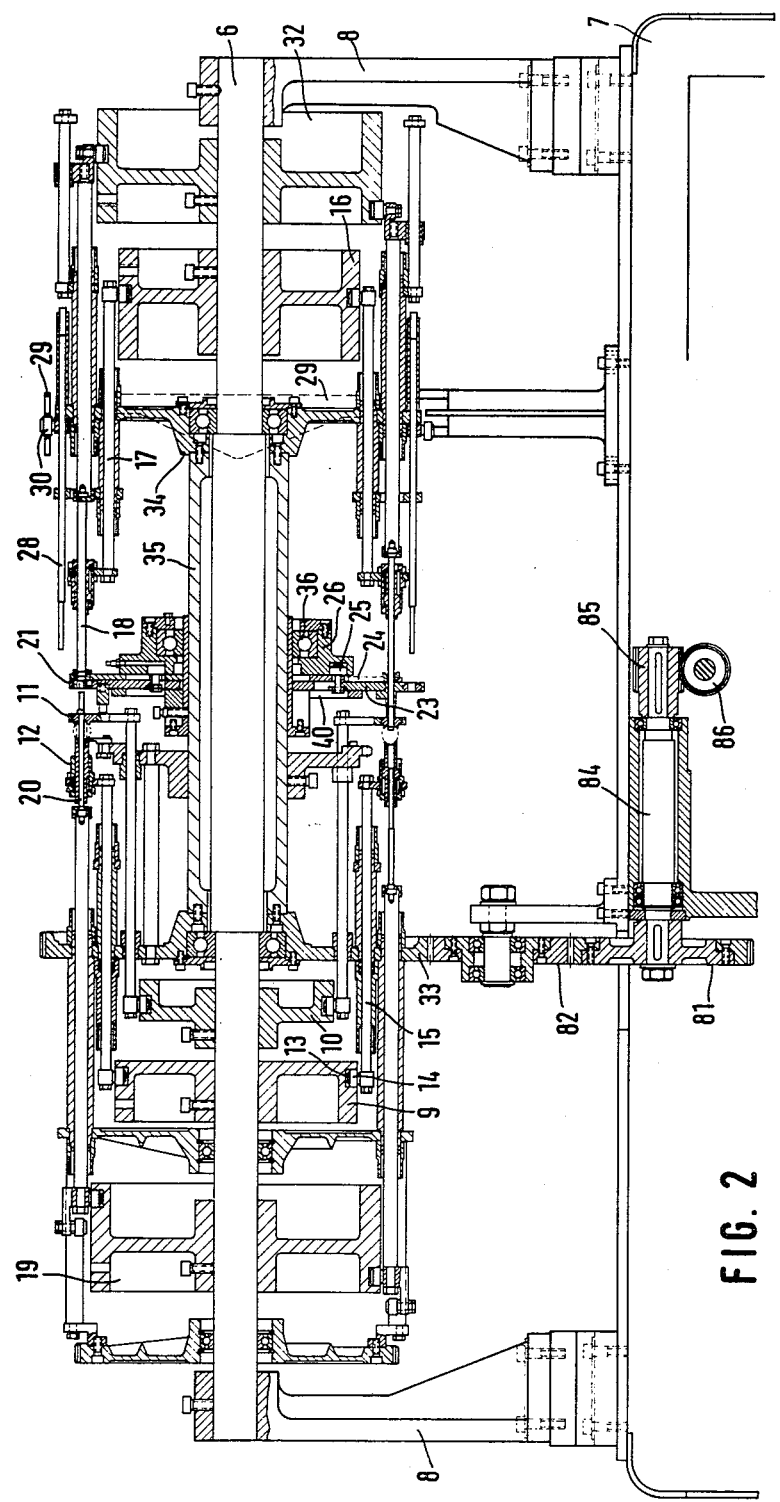
FIG. 2 is a longitudinal section of the machine at the level of its fixed shaft, in which the lower frame, on which the driving elements are seated, has not been represented in its entirety.
Figure 3:
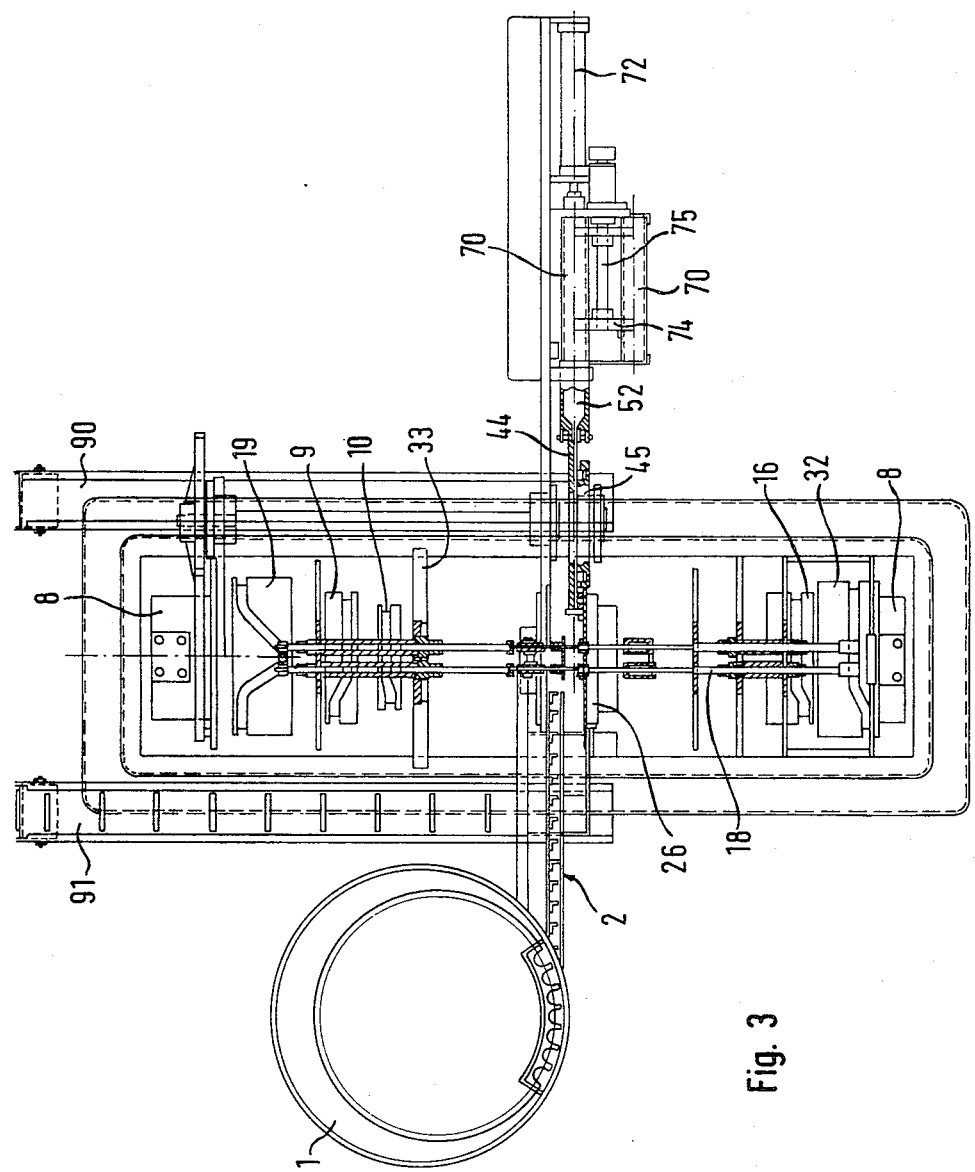
FIG. 3 is a general plan view of the same machine.
Figure 4:
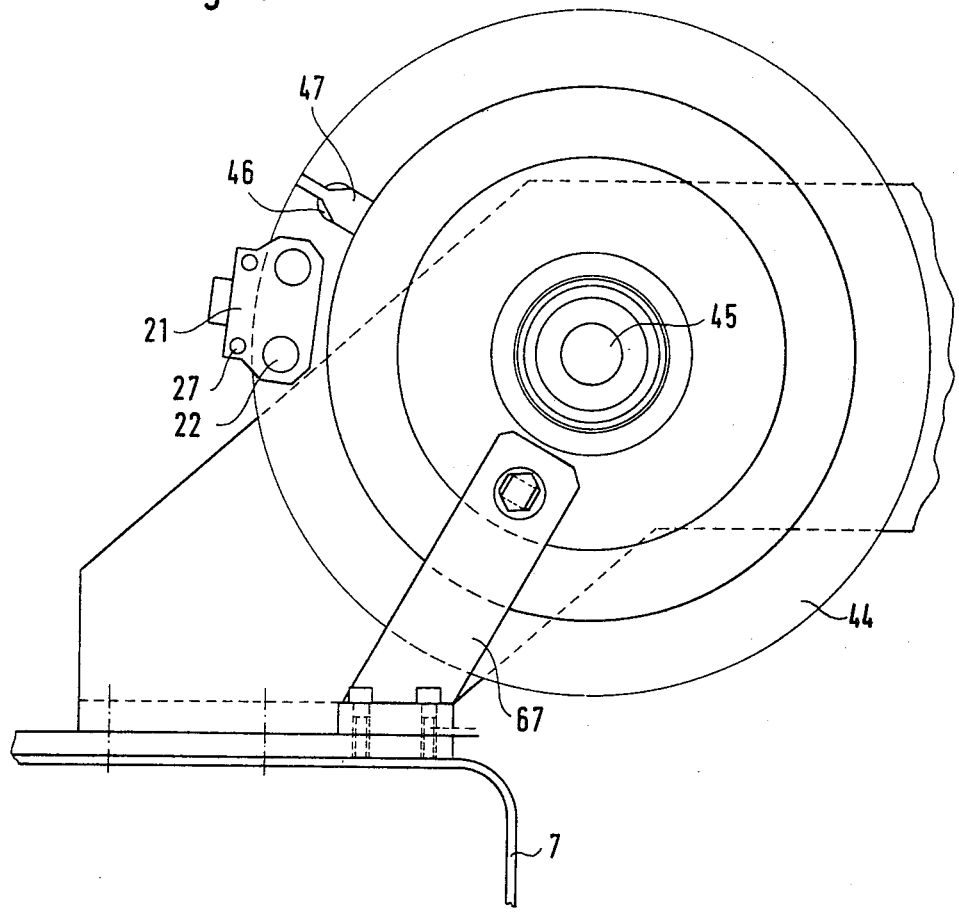
FIG. 4 shows a detail in elevation of the connection of the injector disc to the frame of the machine, with a nozzle positioned for receiving the paste located on the injector disc.
Figure 14:
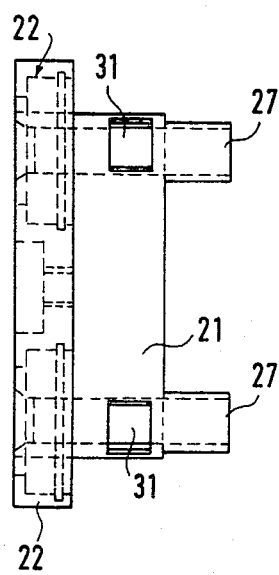
FIG. 14 is a plan view of the same nozzle, in which the openings for access of the paste from the feeder disc may be clearly seen.
Figure 15:
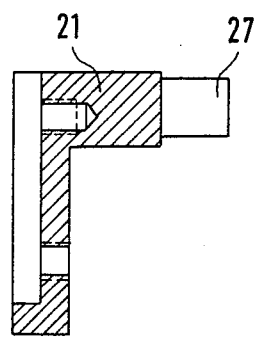
FIG. 15 is a transverse section of the same nozzle through its plane of symmetry.
Figure 16:
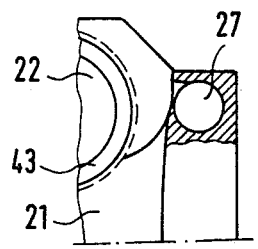
FIG. 16 is a detail of the nozzle referred to, in which one of the ducts for supplying the paste appears sectioned.
Figures 17, 18:
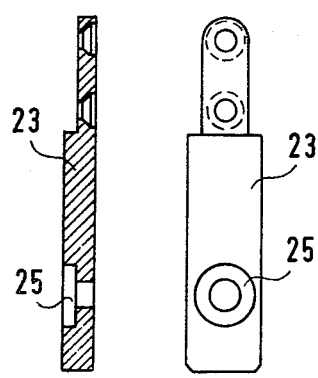
FIG. 17 is a longitudinal section of one of the strips which support the respective paste supply nozzles.
FIG. 18 is a frontal view of the strip referred to in the foregoing figure.
Figure 22:
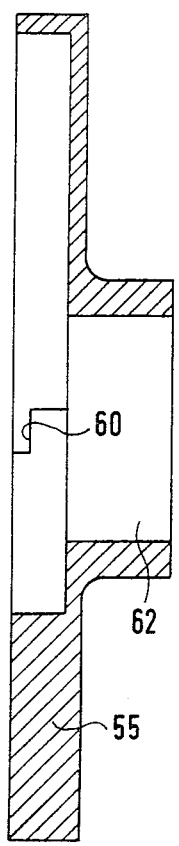
FIG. 22 is a diametric section of the same element of the cam shown in FIG. 21.
Figure 21:
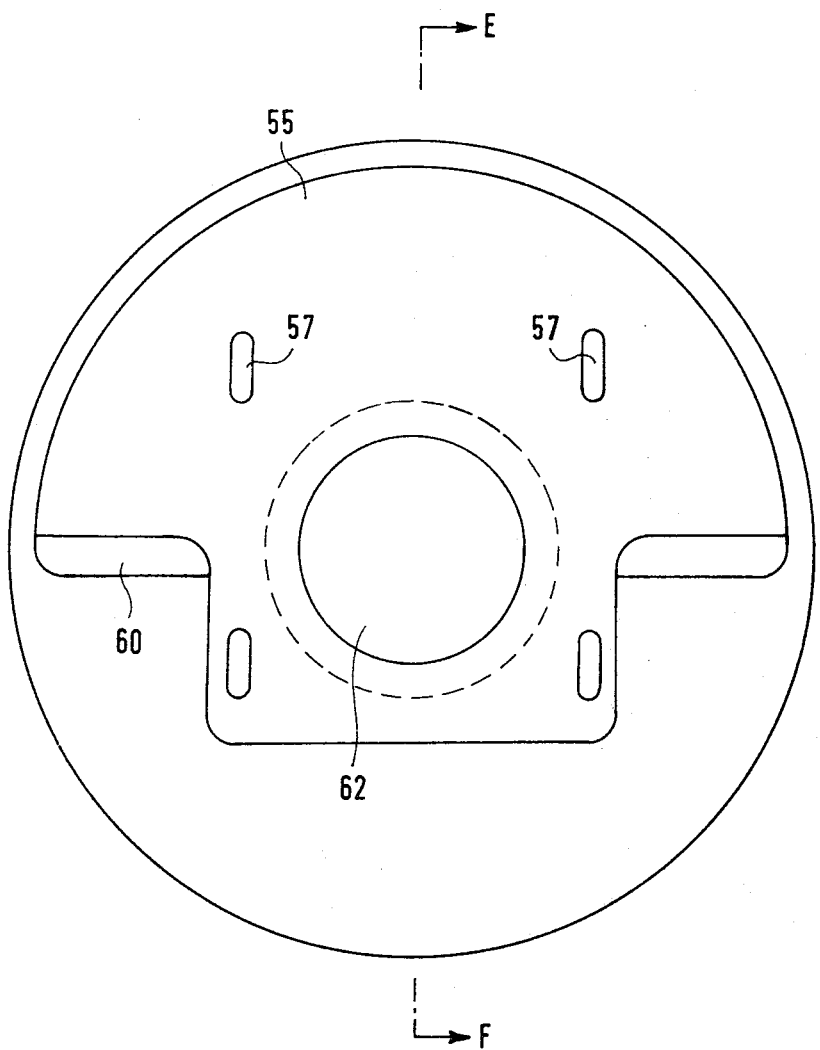
FIG. 21 is a frontal view of one of the two elements which form the cam corresponding to the feeder disc injectors shown in FIGS. 19 and 20.
Figure 23:
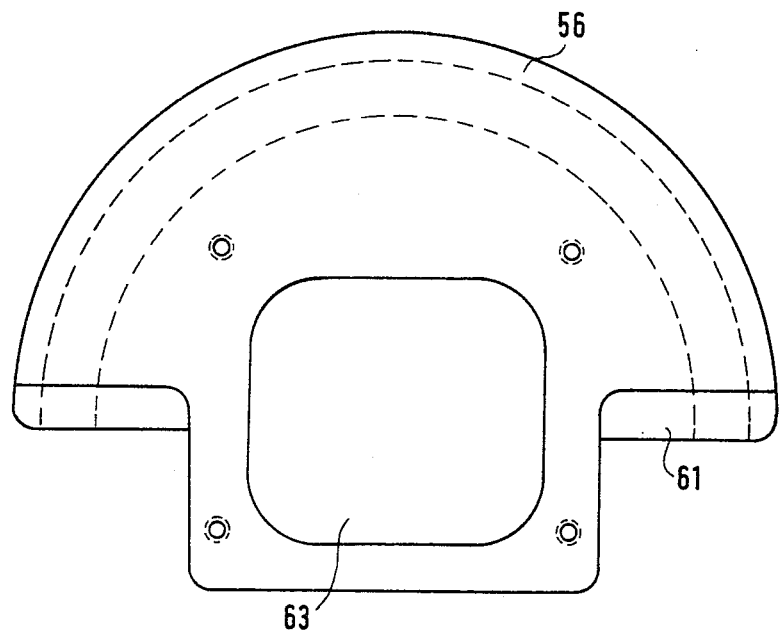
FIG. 23 is a frontal view of the other piece that constitutes the cam.
Figure 24:
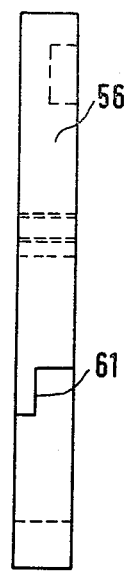
FIG. 24 is a profile of this second piece.

The aforementioned rotatable drum is mounted on a fixed shaft 6, which is joined to the machine frame 7 by means of two end supports B (FIG. 2).

A number of cams are secured to the aforementioned fixed shaft 6, which cams effect the appropriate longitudinal displacements of the various elements that constitute the rotatable drum.

Continuing with the advance of the olives in the operational cycle of the machine, mention should be made in the first place of cams 9 and 10 of which cam 10 constitutes the means of displacing a cam 11 for gripping or holding the olive, with the cooperation of cam 9 which acts on the other element 13 of the clamping member.

Each of these cams 9 and 10 is provided with a perimetric channel 13 in which a roller 14 acts, which is joined to the transmission bar 15, which transmits movement to the pertinent clamping member.

Therefore, in the first operational phase the olive is gripped so that the various operations of pitting and stuffing can be effected on it, the cam 11 having been provided with a rubber sleeve which absorbs the small differences in size from one olive to another.

Thereafter the cam 16, through its pertinent transmission rod 17, causes the action of the cutter 18 which cuts off the top of the olive.

Thereafter the cam 19 acts on the piercer 20 housed axially in the interior of the clamping member 12, and which, by means of the cam 11 of the gripper element, ejects the pit.

Between the piercer member 20, which ejects the pit from the olive, and the cutter 18, which cuts and receives the top, the nozzle 21 is situated which nozzle, in the operational phase of ejecting the pit, presents its orifices 22 opposed to the abovementioned ejector piercer element 20, in such a way that the olive pits are housed in these orifices 22 for their subsequent and definitive expulsion.

Each of the nozzles 21 is connected to support strips 23, which in turn are mounted on a support disc 24, situated radially so that the strips 23 have a roller 25 which acts on a cam 26. This cam 26 determines whether the orifices 22 are opposed to the cutter 18 and to the expeller piercer element 20 or whether it is the orifices 27 of the nozzles which are opposed to these elements.

Therefore the ejector piercer element 20 draws the pit from the olive and houses it in the orifice 22 of the nozzle 21 while previously the top cut off by the cutter 18 has been housed in the interior of the said cutter element.

In the following operational phase the nozzles 21 are projected outwards in such a way that the orifices 22 occupy a position more exterior than the original position; being opposed to the pit expeller elements 28 which expeller elements are displaced by the cam 29 through the bearing 30 connected to them.

In this outwardly projected position the nozzles 21 are perfectly situated to receive the anchovy paste through the lateral windows 31 leading to the interior of the orifices 27 as will be described hereinafter.

When the anchovy paste has been received in the interior of the nozzles 21, another cam 32 causes the expulsion of the cover housed in the interior of the cutter 18, which cover must pass through the orifice 27 of the nozzles, so that in its displacement it causes the paste situated in its interior to be carried along until it is deposited in the interior of the olive, which is closed by placing on it the cover which was previously withdrawn.

The structure described, that is to say the clamping elements for gripping the olive, the ejector piercer element which ejects the pit, the cutting element, the element which expels the cover and the paste, the element which definitively expels the pit and the nozzle, are elements which repeat successively around the rotatable drum with the same rhythm as the links of the feed chain 2 so that all these elements are in operation at the appropriate moments as determined by the pertinent cams.

The movement of the rotatable drum is received from the driving elements through the receiver crown 33, on which the different driving rods corresponding to cams 9, 10, and 19 are mount in such a way that they can slide, that is to say the cam pertaining to the two cams or holder elements of the gripper and to the cam corresponding to the piercer element which expels the pits from inside the olive; the movement being transmitted to a disc 34 on which are mounted, also in such a way as to be able to slide, the rods that are displaceable by the cams 16, 29, and 32, which correspond respectively to the cutter, the definitive pit expeller, and the element which expels the cover and the paste; the receiver crown 33 and the disc 34 are connected to each other for the transmission of movement by means of a sleeve 35 mounted on the fixed shaft 6.

This structuring makes it necessary that the cam 26, corresponding to the paste nozzles 21, is mounted on the sleeve 35 by means of the bearings 36, which permits keeping the cam 26 static.

This cam 26, for driving the nozzles 21 can be observed in detail in FIGS. 10 and 11 in such a way that, specifically FIG. 10 shows how the sliding channel 37, of the roller 25 presents a large sector which corresponds to the same reference number 37, and during which the nozzoles are withdrawn and another smaller sector 38, in which the said nozzles are projected outwards. As has been said the nozzles 21 are joined respectively to strips 23 of an elongated rectangular configuration, which are housed in grooves 39 provided in a radial arrangement on the support disc 24, being perfectly fixed in the said grooves 39 with the cooperation of a cover 40 which is joined to the said disc 24. This disc 24 is provided with windows 41 through which the rods corresponding to the rollers 25 emerge, while the cover 40 also has windows 42 through which it can be manipulated on the clamping screw of the abovementioned shafts of the rollers 25.

In FIGS. 6 and 7 the structure of the support disc 24 can be seen in complete detail, while FIGS. 8 and 9 show the structure of the cover 40.

The configuration of the nozzles 21 can be seen graphically in FIGS. 12 to 16 which show that it adopts an L-configuration, each nozzle being equipped to handle two olives simultaneously, having on one of its branches the two orifices 22 for the reception of the two corresponding pits and these orifices being provided with a pad 43 for the appropriate retention of the pits. On its other branch are situated the orifices 27 which receive the paste through the lateral openings 31; on the orifices 27 subsequent to the deposit of the paste, the elements act which push the cover of the olive, with the consequent entraining of the paste to the interior of the olive.

The introduction of the paste into the interior of the orifices 27 of the nozzles 21 and through the windows 31 is carried out by means of a feed disc 44, which is mounted on a shaft 45 parallel to the main fixed shaft 6 of the machine.

On the said feed disc 44 (FIG. 19) a series of prismatic slots 46 are provided in a radial arrangement, in the interior of which the injector elements 47 are housed which are displaceable also radially by the cam 48 through which the rollers 49 run, and which are joined to the said injector elements. The aforementioned cam 48 has a prominent sector 50 which causes the expulsion of the injector element 47 in the specific situation in which the said injector elements are situated opposed to the nozzles 21, and more specifically to the windows 31 of the said nozzles. It is evident that for this the paste feeder disc 44 and the rotatable drum on which the nozzles 21 are mounted must be situated in tangential contact at the moment of effecting the supply of paste.

It is also evident, and as may be seen in any of FIGS. 1 to 19, the housings 46 for the injector elements 47 have marked narrowing 51 in their outlet zone, which narrowing also effects the injector elements 47 in such a way that this external end zone configures a cylinder with its corresponding expeller piston. From an observation of FIG. 1 it may be seen that the cam 48 determines the intake of the injector elements in correspondence with the paste supply nozzles 52 so that the cylinders formed in them are loaded, while in the zone corresponding to the prominence 50 of the cam, the cam causes the expulsion of the said injector elements 47, and therefore of the anchovy paste, towards the interior of the orifices 27 of the nozzles 21 through the windows 31.

The housings of the paste feeder disc 44 have orifices 53 on their inner end zone through which emerge the shafts of the rollers 49 which slide on the cam 48.

However, the amount of paste to be supplied is variable in relation to the size of the olive, for which reason it is necessary that the chambers or cylinders established between the paste feeder disc 44 and the dowel injector elements 47 housed therein are also variable. This chamber which is shown in FIG. 1 with the reference number 54, is variable only in the loading zone of the feeder disc 44, but it must always be cancelled in the unloading zone of the aforementioned disc.

For this purpose provision has been made for the cam 48, fixed with respect to the shaft 45 and consequently with respect to the paste feeder disc 44, to be constituted by two pieces; the one corresponding to the unloading zone being fixed, while the other, corresponding to the loading zone is displaceable with respect to the first.

The configuratin of these two pieces can be observed in detail in FIGS. 21 to 24, their assembly being represented in FIGS. 25 and 26. In these figures the fixed piece has the reference number 55 while the movable piece is numbered 56, the fixed piece 55 has slit orifices 57 which permit varying the position of the movable piece 56. Both pieces are provided with perimetric channels 58 and 59, which together determine the line of eccentricity which appears in FIG. 1 with the reference number 48. For the purpose of establishing a constant continuity in the channel 58-59 assembly, which displaces the rollers secured to the injector dowel elements, provision has been made for the pieces 55 and 56 to have respective gradations 60 and 61 in their locking zone, which make it possible, within certain limits, to separate these two pieces from each other, keeping one roller track for the rollers 49, without any point of interruption.

Figure 28:
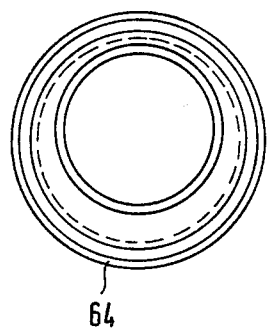
FIG. 28 is an end view of the shaft referred to in the foregoing figure.
Figure 27:
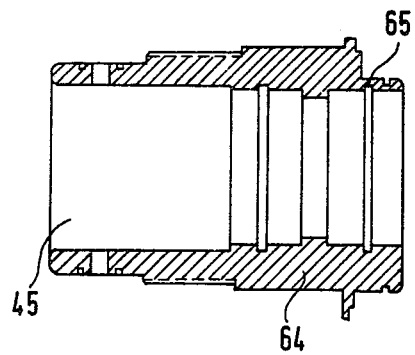
FIG. 27 is a longitudinal section of the shaft on which the cam of FIG. 25 is mounted, which constitutes a body that graduates the travel of the said cam.

The two pieces 55 and 56 which form the aforementioned cam, each have orifices 62 and 63 by which they are assembled on a shaft 64 and which may be seen in FIGS. 27 and 28, so that the shaft determines in turn a cam 65 for the movable piece 56 acting as a graduator element which permits varying the position of the piece and consequently varying the magnitude of the load of the paste feeder disc. This shaft 64 is prolonged exteriorly in a member which operates the graduation, provided with a scale which indicates the amount of paste supplied in each situation.

As has been said previously, while the paste feeder disc 44 is subject to a rotary movement synchronized with that of the rotatable drum, the cam 48 must remain fixed for which reason it is mounted by means of bearings 66 on the shaft 45 at the same time that it is secured to a support 67 which fastens it to the frame 7 (FIG. 5).

Figure 29:
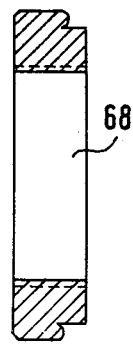
FIG. 29 finally, shows the checknut that locks the body of the cam shown in FIG. 25.

The two pieces 55 and 56 of the cam are mounted on the graduator element 64 by means of a check nut 68 which is shown in detail in FIG. 29.

For the purpose of facilitating the displacement of the piece 56 with respect to the piece 55 in the variation of the eccentricity in the loading sector of the aforementioned cam 48, a bearing 69 has been provided between these two pieces.

The loading cylinders 54 formed in the feeder disc 44 by the injector dowels 47 is effected, as has been said, by means of the injector nozzles 52, two of which coincides on the periphery of the aforementioned feeder disc 44 in its loading zone, presenting a diameter considerably larger than that of the injection cylinders 54 so that these cylinders 54 are kept opposed to the nozzles for a sufficiently long time to ensure their perfect loading. The supply of paste to the injector nozzles is made by tubes 70 which hold the paste, and which are operationally opposed to the nozzles 52. These tubes are open at their ends so that they can receive the impeller pistons 71 driven by the pneumatic cylinders 72.

As shown graphically in FIG. 1, and in accordance with what has been explained previously, two injector nozzles 52 have been provided so that while one of them is in operation, the replacement of the empty paste tube 70 by a full tube may be carried out in the other, establishing an operational alternative in the supply of paste which makes the stopping of the machine unnecessary.

The supply of tubes 70 to each of the two injector nozzles is made by two ramp guides 73 in which the aforementioned tubes 70 are stored. The replacement operation is effected by using respectively pairs of stars 74, corresponding to the two independent feed chains, so that the stars have dentations that corresponds in form and size to the tubes 70, and each pair of stars 74 is mounted on a shaft 75 which, when it rotates, causes the withdrawal of the empty tube and its simultaneous replacement by a full tube, by taking from those existing in the feed ramp 73. The movement of the shafts 75 and therefore of the stars 74 is caused by the relevant pistons 76 which act respectively on connecting rods 77, which effect the aforesaid rotation.

The movement of the different driving elements of the machine is achieved by a motor 78 which, by means of the transmission 79, is connected to a reducer 80. The output of the said reducer 80 is connected to a transmission crown 81 which, by means of the transmission pinion 72, transmits the movement to the receiver crown 33 of the rotatable drum, while at the same time it does so to the shaft 45 of the paste feeder disc 44, through the transmission and synchronization pinion 83 mounted opposite to the disc 44.

A pinion 85 is secured to the shaft 84 of the transmission crown 82 which meshes with a second helicoidal pinion 86 secured to an anteroposterior shaft 87 so that the anterior and posterior extremities of the said shaft 87 have secured to them the pulleys 88 and 89 corresponding to the belts 90 and 91 provided respectively for carrying away the pits and the stuffed olives.

The machine also has a handwheel 92 for tightening the belt 79 which transmits movement from the motor 78 to the reducer 80; this handwheel acts also to vary the speed for which the pulley 93 of the motor has been provided with a trapezoidal section, with the possibility of the regulatable separation of its lateral discs so that the greater or lesser degree of approach between these two discs determines an increase or a reduction of the effective diameter of the pulley and therefore the variation of the speed of the machine.

Therefore, the olives leave the hopper 1 entrained by the chain 2 and reach the rotatable drum where they are gripped by the clamping members 11 and 12, being kept in this position until the operational cycle of the machine has been completed. When the olive has been clamped the cutter 18 causes the cover to be cut from the olive, which cover is housed in the hollow interior of the said cutter 18 while the piercer element 20 causes the ejection of the pit, which is housed in the orifice 22 of the nozzle 21.

Thereafter the nozzle 21 is projected outwards with which the orifice 22 is also displaced outwards, leaving its position opposed to the cutting element 18, and attaining a new position of opposition to the pusher element 28, which acts, controlled by its corresponding cam, causing the release of the pit which falls through appropriate ducts to the conveyor 90 for its discharge.

At the same time the orifice 27 of the nozzle has taken up a position opposed to one of the chambers 54 of the paste feeder disc 44, in which chamber there is a determined amount of anchovy paste, previously established with the relative positioning between the two elements 55 and 56 which constitute the cam 48. On this point of tangential coincidence between the window 31 of the nozzle 21 and the corresponding chamber 54 of the paste feeder disc 44, the activation of the cam 48 takes place for the expulsion of the pertinent dowel element 47, and the consequent introduction of the paste into the interior of the orifice 27.

In the final operational phase with the orifice 27 loaded with the previously dispensed amount of anchovy paste, a pusher element housed in the interior of the cutting element 18, controlled also by its corresponding cam, entrains the olive cover also housed in the interior of the cutting element 18, the cover penetrating into the orifice 27 of the nozzle 21 and causing the entraining of the cover and the paste together until they reach the olive which remains gripped between the gripper elements 11 and 12, prefectly stuffing the olive and closing it with the cover which was previously removed from it.

When the pitting and stuffing operations have been completed the gripper members 11 and 12 open so that the olive falls, also through suitable channels, to the conveyor belt 91 for the discharge of the olives.

The materials, form, size, and arrangement of the elements may be varied provided that this does not represent any alteration of the essence of the invention.

The terms in which this descriptive memorandum has been drawn up should be taken always in a broad, non-limitative sense.

I claim:

1. An improved machine for pitting and stuffing olives comprising a fixed shaft, a drum rotatably mounted on said fixed shaft, a feed hopper for olives, means for transporting the olives from said feed hopper into tangential engagement with said drum, cam means secured to said shaft, means in operative connection with said cam means for gripping the olives on the drum, for cutting the olives, and for pitting the cut olives as said drum completes one revolution on said shaft, wherein the improvement comprises that said means for cutting the olives comprises a member for receiving the portion of the olive removed in the cutting operation, means for supplying a paste, such as an anchovy paste, into a pitted olive and for cooperation with said member receiving the cut portion of the olive for replacing the cut portion in the olive after stuffing the olive with the paste, said means for supplying paste comprises a support disc positioned on said fixed shaft adjacent the plane of movement of the olives around said drum, a cover coaxial with said support disc and joined thereto, a plate cam coaxial with and connected to said cover, a plurality of radially extending strips radially slidably supported on said plate cam, a nozzle secured to the radially outer end of each said strip so that each said nozzle can be moved radially between a first position position and a second position relative to the olives held on said drum as said plate cam rotates about said fixed shaft, means for containing a supply of the paste for stuffing the olives, transfer means for receiving the paste from said supply means and for supplying the paste into said nozzles whereby in the first position said nozzles receive pits displaced from the olives and in the second position supply the paste into the pitted olives.

2. An improved machine, as set forth in claim 1, wherein said plate cam being shaped so that said nozzles are retained in the first position during approximately two-thirds of one revolutin of said plate cam and in the second position during the remaining one-third revolution with said nozzles being disposed radially inwardly during two-thirds of each revolution and being displaced radially outwardly during the remaining one-third of a revolution.

3. An improved machine, as set forth in claims 1 and 2, wherein each said nozzle has an L-shaped configuration having a first leg and a second leg, said first leg extending perpendicularly to said shaft, said second leg extending parallel to said shaft, said first leg having a pair of first orifices therein with an elastic element in each of said first orifices for receiving and holding pits displaced from the olives, said cover having orifices therein for receiving the cut portion of the olive, said means for cutting the olives and for pitting the olives being displaceable through the first orifices and the orifices in said cover, a pair of second orifices formed in said second leg, each of said second orifices having a lateral window therein for receiving the paste from said transfer means, said second leg of said nozzle being located radially inwardly from said firt leg, so that in the first position said first orifices are arranged to receive the pits displaced from the olives while the second orifices receive paste, and in the second position said nozzle being displaced radially outwardly so that said first nozzles are in position for the release of the pits therefrom and said second nozzles are in position for supplying the paste into the olives.

4. An improved machine, as set forth in claim 3, wherein an element for displacing the olive pits from the first orifices in said nozzles being located radially outwardly from said means for cutting and for pitting olives, a cam arranged on said fixed shaft for operating said element, and said cam being spring-biased.

5. An improved machine, as set forth in claim 3, wherein said means for gripping, for cutting and for pitting olives comprises a first element for gripping the olives, a second element for cutting the olives, and a third element for pitting the olives, a first cam operating said first element, a second cam operating said second element, and a third cam operating said third element, each of said first, second and third cams having a bearing slidable in a channel in the corresponding cam, a sleeve coaxial with and encircling said fixed shaft, and means connected to said first, second and third cams for effecting the movement of said first, second and third elements.

6. An improved machine, as set forth in claim 3, wherein said transfer means comprises a transfer shaft disposed in parallel relation to and spaced laterally from said fixed shaft, a transfer disc rotatably mounted on said transfer shaft and having a circumferential periphery extending tangential to said windows in said second orifices on said nozzles, said transfer duct having a number of radially extending grooves therein opening through said circumferential periphery, an ejector associated with each said groove, a transfer cam secured laterally to said disc for driving said disc in synchronization with the movement of said drum so that paste can be ejected from said grooves in said transfer disc through said windows in said second orifices in said nozzles for subsequent passage into the olives.

7. An improved machine, as set forth in claim 6, including means for varying the capacity of said grooves in said transfer disc for varying the amount of paste to be supplied to each olive, a stationary cam for operating said transfer disc, said stationary cam comprising two semi-cylindrical parts one of said parts being fixed and corresponding to the zone of said transfer disc where the paste is supplied to said nozzles the other said part being displaceable relative to the fixed part for varying the displacement of the ejector in the phase of introducing the paste into said grooves in said transfer disc, said parts having edges graduated in opposition to one another, a shaft mounting said parts and having an eccentric sector for displacing said movable other said part, and means associated with said shaft for indicating the amount of paste supplied.

8. An improved machine, as set forth in claim 7, wherein said means for containing a supply of the paste comprises a pair of injector nozzles disposed in laterally spaced relation and each having a curved concave face disposed in contact with the circumferential periphery of said transfer disc for supplying paste into said grooves in said transfer disc, a plunger in each said injector nozzle, means for supplying paste cartridges to said injector nozzles, said injector nozzles being operational one at a time so that one of said injector nozzles can be used for supplying paste while the other said injector nozzle is being refilled.

9. An improved machine, as set forth in claim 8, wherein said means for containing a supply of the paste includes means including a number of guide elements for directing the cartridges to said injector nozzles so that the empty cartridges can be automatically replaced with a full one, a number of entraining starts having a number of maltese crosses, a reducer motor governed by an electric circuit and arranged to receive a signal from said plungers acting in said injector nozzles for indicating when the paste within said injector nozzle is depleted for advancing said stars for supplying another filled cartridge.

* * * * *